United States Patent [19]

Taboada et al.

[11] Patent Number: 4,523,809

[45] Date of Patent: Jun. 18, 1985

[54] METHOD AND APPARATUS FOR GENERATING A STRUCTURED LIGHT BEAM ARRAY

[75] Inventors: John Taboada, San Antonio, Tex.; Bruce R. Altschuler, Dayton, Ohio

[73] Assignee: The United States of America as represented by the Secretary of the Air Force, Washington, D.C.

[21] Appl. No.: 520,356

[22] Filed: Aug. 4, 1983

[51] Int. Cl.³ .............................................. G02B 27/10
[52] U.S. Cl. .................................... 350/163; 350/170; 356/354
[58] Field of Search ............... 350/170, 169, 163, 166; 356/354, 359, 376, 2

[56] References Cited

U.S. PATENT DOCUMENTS

| | | | |
|---|---|---|---|
| 2,200,467 | 5/1940 | Cristiani | 350/170 |
| 2,443,722 | 6/1948 | Carlson . | |
| 2,527,896 | 10/1950 | Thirard et al. | 350/170 |
| 4,070,683 | 1/1978 | Altschuler et al. | 354/77 |
| 4,149,773 | 4/1979 | Reid | 350/170 |
| 4,294,544 | 10/1981 | Altschuler et al. | 356/376 |
| 4,350,410 | 9/1982 | Minott | 350/170 |
| 4,370,026 | 1/1983 | Dubroeucq et al. | 350/170 |

OTHER PUBLICATIONS

John M. Young et al., "Topographic Mapping of Oral Structures—Problems and Applications in Prosthodonics," *SPIE* 1981, vol. 283, pp. 70-77.
Martin D. Altschuler et al., "The Numerical Stero Camera," *SPIE* 1981, vol. 283, pp. 15-24.
Martin D. Altschuler et al., "Laser Electro-Optic System for Rapid Three-Dimensional (3-D) Topographic Mapping of Surfaces," *Optical Engineering*, Nov./Dec. 1981, vol. 20, No. 6, pp. 953-961.
John Taboada, "Coherent Optical Methods for Applications in Robot Visual Sensing" *SPIE* 1981, vol. 283, pp. 25-29.

*Primary Examiner*—Jon W. Henry
*Attorney, Agent, or Firm*—Donald J. Singer; John R. Flanagan

[57] ABSTRACT

Apparatus for simultaneously generating a space volume-filling structural light beam array utilizes a prism assembly which refracts a laser light beam so as to partition it into four separate segments. The four segments produced the two-by-two rectangular beam array by coherent interference of the segments.

15 Claims, 8 Drawing Figures

REGIONS FILLED WITH GLYCERIN FOR INDEX MATCHING

METHOD AND APPARATUS FOR GENERATING A STRUCTURED LIGHT BEAM ARRAY

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to analysis of surface topography of an object and, more particularly, is concerned with apparatus and method for generating a space volume-filling structured light beam array for use in non-contact surface metrology of various solid forms.

2. Description of the Prior Art

Generation of rectilinear arrays of light beams has been found useful for the analysis of surface object topography. Refer for example to U.S. Pat. No. 4,070,683 (issued to Bruce R. Altschuler and John Taboada) and U.S. Pat. No. 4,294,544 (issued to Bruce R. Altschuler, John Taboada and Martin D. Altschuler). Also, see the following articles: (1) "Rectangular Grid Fringe Pattern for Topographic Applications" (by John Taboada and Bruce R. Altschuler, *Applied Optics*, March 1976, Vol. 15, No. 3, pp. 597–599); (2) "Measuring Surfaces Space-Coded by a Laser-Projected Dot Matrix" (by Martin D. Altschuler, Bruce R. Altschuler and John Taboada, *SPIE* 1979, Vol. 182, pp. 187–191); (3) "Laser Electro-Optic System for Rapid Three-dimensional (3-D) Topographic Mensuration" (by Bruce R. Altschuler, Martin D. Altschuler and John Toboada, *SPIE* 1979, Vol. 182, pp. 192–196); (4) "Topographic Mapping of Oral Structures—Problems and Applications in Prosthodonitcs" (by John M. Young and Bruce R. Altschuler, *SPIE* 1981, Vol. 283, pp. 70–77); (5) "The Numerical Stero Camera" (by Martin D. Altschuler, Jeffery L. Postamer, Gideon Frieder, Bruce R. Altschuler and John Taboada, *SPIE* 1981, Vol. 283, pp. 15–25); and (6) "Laser Electro-Optic System for Rapid Three-dimensional (3-D) Topographic Mapping of Surfaces" (by Martin D. Altschuler, Bruce R. Altschuler and John Taboada, *Optical Engineering*, November/December 1981, Vol. 20, No. 6, pp. 953–961).

Prior methods of generating rectilinear or rectangular beam arrays have involved the interferometric combination of the front and back reflections of thin beam splitter or shearing plates, reflecting a point source of laser light. The resulting pattern although nicely arranged and collimated suffers from extensive attenuation of the working laser beam.

Consequently, there exists a need for a more efficient means of producing such a rectangular array.

SUMMARY OF THE INVENTION

The present invention provides a method and apparatus for generating a rectangular light beam array designed to permit most of the input light to remain in the output array. The invention makes use of a four segment prismatic wavefront partition to achieve an interference beam pattern with rectangular order in two dimensions of its cross section. The novel optical arrangement permits a simple scheme for optimum overlap of the interfering wavefronts: in essence, conversion of a single circular beam to rectangular beam array without aperturing. In previous approaches, a sequential shearing interference of the fringes was used to generate the required array pattern. That pattern, although well structured, was extremely low in intensity when using a low level laser. The present invention raises the efficiency from about 0.006 to as high as 0.90.

Accordingly, the present invention is directed to a method and apparatus for generating an ordered MxN array of structured light beams simultaneously and with infinite focus, thus filling a spatial volume with an array of structured light beams to be applied, for example, to non-contact 3-D surface metrology of an object. The method and apparatus comprise the operative steps of: (a) generating a coherent light beam; (b) projecting the base with slight divergence through a predetermined plane; (c) partitioning the beam received at the plane into a two-by-two light beam segment pattern; (d) generating from the segment pattern, a 2-D fan array of projector beams; and (e) projecting the array in a direction orthogonal to the plane of the array onto the object. The partitioning of the beam occurs through refraction thereof into four separate segments which produces a rectangular beam array by coherent interference of the four segments of the beam. Beam refraction is produced by transmission of the beam through a single pyramid-shaped prism, or two orthogonally placed linear edged prisms.

DETAILED DESCRIPTION OF THE INVENTION

Figure 1:
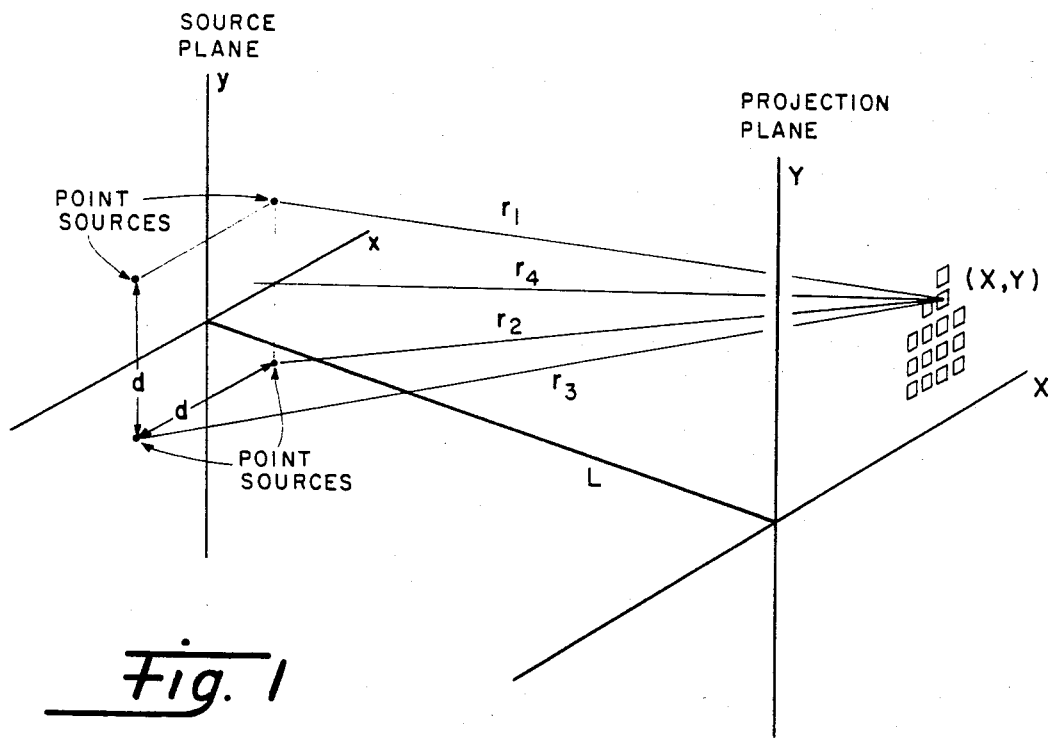
FIG. 1 schematically illustrates the formation of a rectangular beam array by the linear superposition of the radiation waves emanating from a two-by-two array of point sources of coherent radiation.

As schematically represented in FIG. 1, a rectangular beam array can be produced in projection plane XY by linear superposition of radiation waves emanating from a two-by-two array of point sources of coherent radiation located in source plane xy. (See "Coherent Optical Methods for Applications in Robot Visual Sensing" by John Taboada, *SPIE* 1981, Vol. 283, p. 25.)

Superposition of the coherent waves produces interference fringes, creating the light field of (X,Y) given by:

$$E = E_o \sum_{j=1}^{4} \exp i\left( \frac{2\pi}{\lambda} [(X - x_j)^2 + (Y - y_j)^2 + (-L)^2]^{\frac{1}{2}} - \omega t \right) \quad (1)$$

where $(x_1=d/2, y_1=d/2)$; $(x_2=d/2, y_2=-d/2)$; $(x_3=-d/2, y_3=-d/2)$; $(x_4=-d/2, y_4=d/2)$; and $\lambda$ is the wavelength and t is the time. The intensity (I) in the far field is obtained by a binominal approximation for the root quantity and by squaring Equation (1):

$$I = E^*E = 16E_o^2 \cos^2\left(\frac{\pi dX}{L\lambda}\right) \cos^2\left(\frac{\pi dX}{L\lambda}\right). \quad (2)$$

This is a square array of beams, periodic in small deviaton. Provided the two-by-two point source array can be synthesized, then the desired rectangular beam array can be produced.

Figure 2:
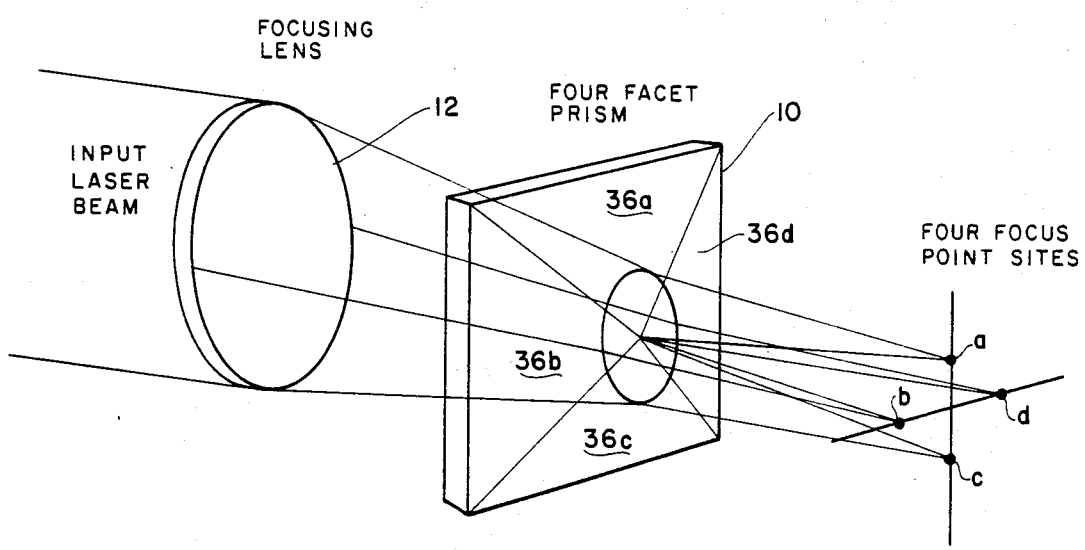
FIG. 2 schematically illustrates the synthesis of four point sources by focusing a coherent beam through a four facet pyramid prism which comprises the preferred form of the prism assembly contemplated by the present invention.

The novel concept underlying the present invention is to generate the point sources matrix located in the source plane at the left side of FIG. 1 by use of a four facet pyramid prism 10, such as shown in FIG. 2. The four point sources are synthesized by lens 12 focusing (or diverging, in which case the source points are virtual and located on the incident side) a coherent beam through the four facet prism 10. The prism partitions, through refraction, the incident beam into a two-by-two array of isolated beams. But since the isolated beams originate from a plane wave, the result is a simulation of the four necessary coherent point sources.

Figure 3:
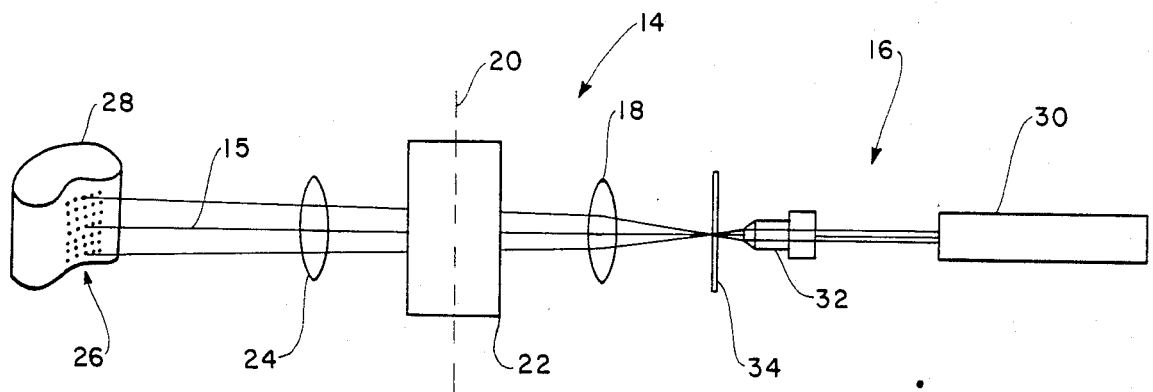
FIG. 3 is a schematic side elevational view of the preferred form of the optical train of the apparatus of the present invention.

One use for the two-by-two light beam array is in non-contact surface metrology of various solid forms, such as those resulting from numerically controlled machining of work pieces. A preferred embodiment of an apparatus for generating the structural light array is depicted in FIG. 3 and generally designated 14. The optical train of the apparatus 14 aligned along its optical axis 15 includes means, generally designated 16, for generating a coherent light beam, means 18 for partially recollimating the beam so as to reduce the divergence angle at a predetermined plane 20, means 22 for partitioning the beam received at the plane 20 into a two-by-two overlapping light beam array, and means 24 for projecting the array, designated generally at 26, onto an object 28.

The beam-generating means 16 is composed of a coherent laser light source 30 of any convenient wavelength as, for example, a conventional low power HeNe laser, which produces a generally coherent beam of light, a microscope objective lens 32 and spatial filter aperture 34 which form a beam having a generally spherical wavefront. Means 18 is a lens which, while almost completely recollimating the beam, produces a beam divergence of about 3 degrees. The beam partially recollimated by lens 18 is transmitted to a prism assembly located in plane 20. The prism assembly, constituting the beam partitioning means 22, creates the two-by-two light beam array 26. The array is received by means 24 which is a projection lens. The lens 24 further recollimates or diverges the array to a desired angle and projects the array 26 on the object 28. A rotating polarizer can be placed in the optical train to optimize passing a linearly polarized beam through a polarization orientation dependent electro-optical programmable spatial light modulator, as for example, with a PLZT material or a liquid crystal.

As mentioned earlier, the preferred form of the prism assembly 22 is the four facet pyramid prism 10 shown in FIG. 2. The prism 10 is aligned symmetrically about the optical axis 15 such that the laser beam is partitioned into four, generally equivalent, separate segments by refraction of the beam through the four respective faces 36a–36d of the prism and projection to the points a–d. Unlike the rest of the components comprising the apparatus 14 which are off-the-shelf items, the prism 10 has to be specially constructed. Its design criteria is as follows: (a) it must have a very shallow base angle of 1 to 2 degrees; and (b) the segments must be accurately spaced. Also, all sides must be exceedingly flat planes when an orthogonal and evenly spaced array is desired.

Figure 4:
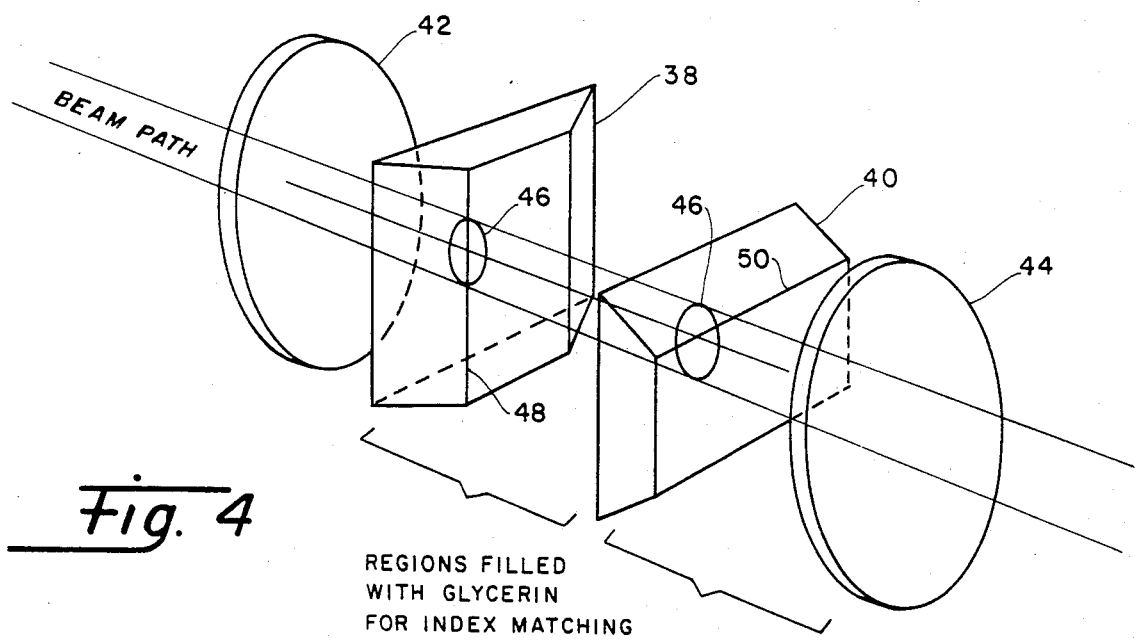
FIG. 4 is a schematic perspective view of another embodied form of the prism assembly used in the apparatus of FIG. 3, being shown in exploded condition in which two linear edged prisms oriented orthogonally are used to create the beam array.
Figure 5:
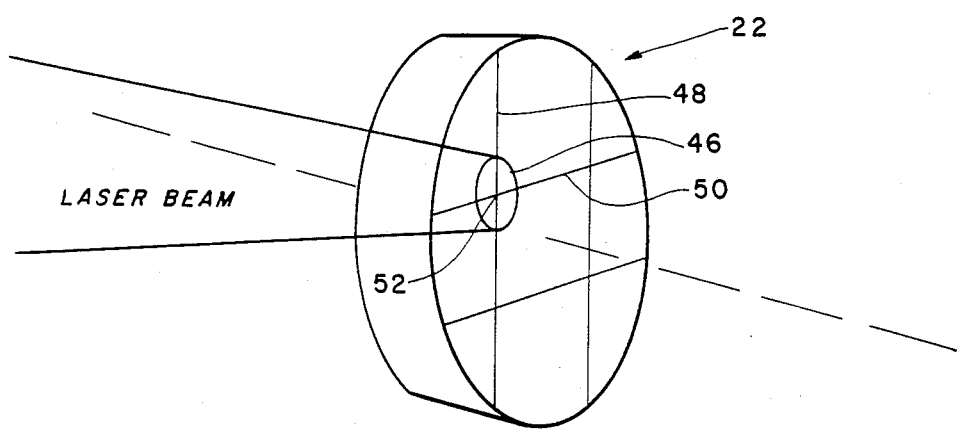
FIG. 5 is a schematic perspective view of the prism assembly of FIG. 4 now shown in assembled condition.

An alternate form of the prism assembly 22 constructed from off-the-shelf components and materials is shown in FIGS. 4 and 5. It includes two crossed Vivitar 3P (three-facet) prisms 38, 40 arranged in tandem and covered by a pair of colored Vivitar filters 42, 44 (color choice of filter to match the laser wavelength) at each end of the assembly. The filters and prisms are assembled in a housing (not shown). Other similar linear edged prisms can be used. The regions between the prisms and filters are filled with glycerin having an index of refraction almost equal to that of the prisms. This match of the respective refractive indices reduces the deviation angle drastically from about 13 degrees to about 0.5 degrees, which is required for the overlapping of the transmitted laser beam 46, as seen in FIGS. 4 and 5. As seen in FIG. 5 the laser beam 46 intercepts the two (three facet) prisms 38, 40 at locations where edges 48, 50 of the respective prisms cross. This crossing at point 52 aligned with the optical axis 15 of the apparatus 14 simulates the configuration of the pyramid prism 10 of FIG. 2.

Figure 6:
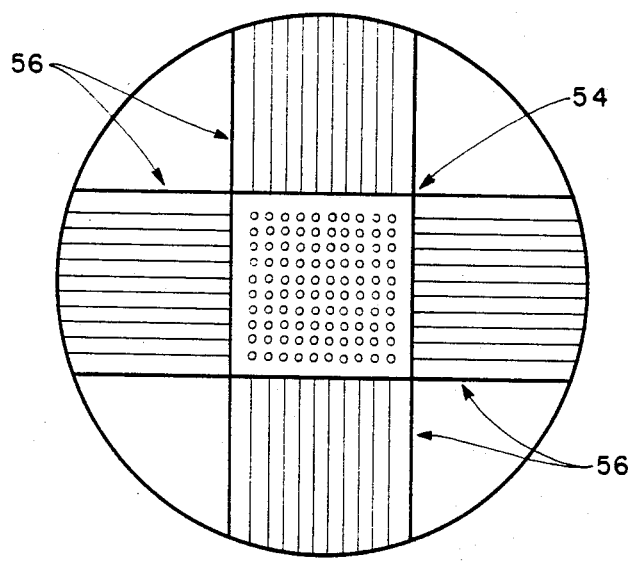
FIG. 6 schematically illustrates the rectangular beam array generated by coherent inteference and superposition of the fringes produced thereby.

The prism assembly 22 produces a two-dimensional (2-D) fan beam array by coherent interference (overlapping or super-position) of the four segments of the plane wave partitioned by the assembly 22. The results of such interference is depicted in FIG. 6. The central region of the pattern, generally designated 54, can be expanded for example by a 5× objective lens 32 of the apparatus 14 in FIG. 3. This results in a pattern about 15×15 cm with about 64×64 beam spots clearly visible in room light even with a laser of less than one milliwatt power. The overlapping region or beam spots contain more than 50% of the light at optimum distance from the prism assembly 22. The non-overlapping regions 56 are parallel interference fringes.

It has been mentioned that the array of structured light beam may be applied to non-contact 3-D surface metrology of an object. For example, the generated array may be projected onto the surface of the object and the reflection viewed off-axis with a video camera. If a spatial light modulator that is programmable is placed in the beam array path prior to the beams projecting on the object, each beam may be turned on or off individually or in sets of ordered patterns. For example, in a similar manner the beams may project on a screen or partially frosted window or heads up display (HUD), while being modulated, for display purposes.

Since the structured light beam array of the present invention can have a very high intensity beam because of its high efficiency (low light yielding a very bright pattern), in an application the apparatus 14 can be combined with a liquid crystal or PLZT or bismuth doped iron garnet pixel and/or row and/or column programmably addressable shutter array to yield real time video projections. Another application would be the use of the apparatus in optical mass memory production and addressing.

Figure 7:
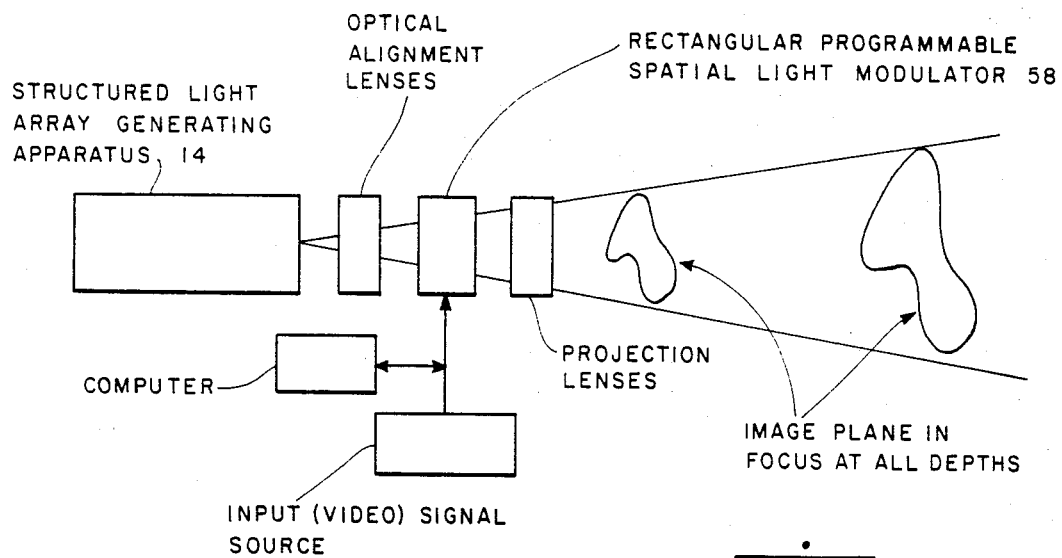
FIG. 7 schematically illustrates application of the apparatus to infinite depth of field video signal display and/or spatially modulated array projection.

Application of the above described apparatus to video display is shown in FIG. 7. The array pattern, because of its collimated nature in the individual beams, can be made to pass readily, with diffraction minimized, through the small aperture of an electronic programmable spatial light modulator 58. The resulting pattern should possess the 2-D video signal but should remain in focus without adjustment of the projection optics at any plane in front of the projection lens. This device should have applications in laser TV projection systems having very high frame rates. It also has applications in structured light illumination of objects for quantitative metrology when reflected spots are viewed by a video camera or other starting light sensor.

Figure 8:
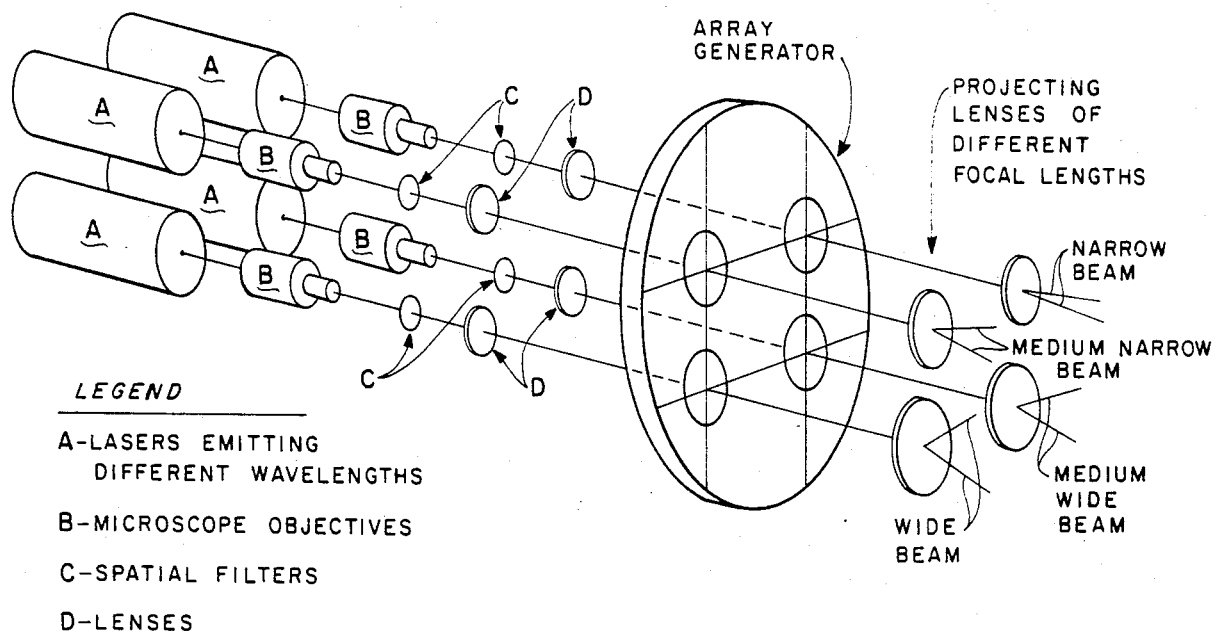
FIG. 8 is a schematic perspective view of apparatus for projecting a multiple wavelength, multiple spatial frequency array.

From FIG. 5 it is noted that as many as four orthogonal edge intersections are present on the beam array generator, so that four independent beam arrays may be created simultaneously. Thus, for example, as seen in FIG. 8, four different laser wavelengths may be used to generate overlapping patterns for multicolored beam array projection using the same apparatus. Or, up to four overlapping array patterns of the same wavelength may be projected. Applications include multispectral structured light projection for robotic metrology and multiband communications optical transmission.

More than four patterns may be created if through each intersection more than one wavelength is coaxially projected. Thus, many multiple wavelengths may be projected through each four facet prism of the assembly shown in FIG. 5 as well as in FIG. 2 and FIG. 8 if multiple wavelengths of laser light are transmitted coaxially. An X,Y shift of the projected sets of beams in the representative plane will occur for each unique transmitted wavelength due to dispersion. This aspect has applications in encoding and analysis of spectral and image data, and radar and communications signal interpretation.

Using the beam array generating assembly of FIG. 4 as seen in assembled form in FIG. 5, not only can each intersecting location create a unique array of one wavelength, but if multiple (different) wavelengths of light are projected coaxially, each of the four intersecting beam sites can project multiple colored (wavelength) unique beam array patterns. If a lens of different focal length is placed in front of each unique array pattern, such as is the case in the apparatus of FIG. 8, the apparatus will allow more than one divergent or convergent array (for example, four arrays) to be simultaneously projected so that, for example, a narrow beam array (high spatial frequency), two slightly different medium beam divergent (or convergent) arrays (medium spatial frequency), and a wide angle beam array (low spatial frequency) could simultaneously be projected onto an object. Thus, projected interference patterns may be created as the summation of two or more slightly different arrays, for holographic display, optical computing and signal processing, and metrology. These simuntaneous multiple wavelength multiple array projections may provide a means for simultaneous spatial encoding (space coding) o the individual beams in the array for reflected dot finding and identification in numerical stero camera applications.

In addition to creating orthogonal and evenly spaced arrays of simultaneously projected laser beams, nonlinear and non-orthogonal arrays may be created by varying the geometry of the prism from flat planar surfaces to curved surfaces, and/or by intersecting the prism surfaces by an angle other than 90 degrees.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A method of simultaneously generating a space volume-filling structured light beam array for projection upon an object in non-contact surface metrology, comprising the steps of:
    (a) generating a coherent light beam;
    (b) projecting said beam with slight divergence through a predetermined plane;
    (c) partitioning said beam received at said plane into four light beam segments of predetermined spacing and pattern;
    (d) generating from said beam segment pattern, a two-dimensional array comprising an interference pattern of said beam segments; and
    (e) projecting said array in a direction orthogonal to the plane of the array onto said object.

2. The generating method of claim 1, wherein said partitioning of said beam occurs through refraction thereof into four separate segments.

3. The generating method of claim 2, wherein said partitioning produces a rectangular beam segment pattern.

4. Apparatus for generating a space volume-filling structured light beam array for projection upon an object in non-contact surface metrology comprising:
    (a) means for generating a coherent light beam;
    (b) means for projecting said beam with slight divergence through a predetermined plane;
    (c) means for partitioning said beam received at said plane into four light beam segments of predetermined spacing and pattern;
    (d) means for generating from said beam segment pattern, a two dimensional array comprising an interference pattern of said beam segments; and
    (e) means for projecting said array onto said object.

5. Generating apparatus as recited in claim 4, wherein said partitioning means comprises means for refracting said beam into four separate segments.

6. Generating apparatus as recited in claim 5, wherein said refracting means comprises a pyramid-shaped prism.

7. Generating apparatus as recited in claim 5, wherein said refracting means comprises a prism assembly composed of two crossed, three-facet prisms arranged in tandem.

8. Generating apparatus as recited in claim 4 wherein:
    said generating means comprises a laser, an objective lens and a spatial filter;
    said projecting means comprises a recollimating lens located subsequent to said spatial filter;

said partitioning means comprises a prism assembly for refracting said beam into four separate segments and producing thereby a rectangular beam array by coherent interference of said four segments of said beam;

said projecting means comprises a projection lens interposed between said prism assembly and said object.

9. A method of simultaneously generating multiple space volume-filling structured light beam arrays of predetermined wavelengths in any combination, comprising the steps of:
  (a) generating coherent light beams of said predetermined wavelengths, including four different wavelengths of light generated as four beams from four sources;
  (b) projecting said beams with slight divergence through a predetermined plane;
  (c) partitioning each beam received at said plane into four light beam segments of predetermined spacings and patterns;
  (d) generating from said beam segment patterns two-dimensional arrays comprising interference patterns of said beam segments; and
  (e) projecting said arrays onto an object in which the derived arrays from each wavelength overlap on the object.

10. The generating method of claim 9 wherein said partitioning of said beams occurs through refraction thereof where each beam partitions into four separate segments.

11. The generating method of claim 10 wherein said partitioning produces multiple rectangular beam segment patterns.

12. Apparatus for simultaneously generating multiple space volume-filling light beam arrays of predetermined wavelengths in any combination, comprising;
  (a) means for generating coherent light beams of said predetermined wavelengths, including four different wavelengths of light generated as four beams from four sources;
  (b) means for projecting said beams with slight divergence through a predetermined plane;
  (c) means for partitioning each beam received at said plane into four light beam segments of predetermined spacings and patterns;
  (d) means for generating from said beam segment patterns two dimensional arrays comprising interference patterns of said beam segments; and
  (e) means for projecting said arrays onto an object in which the derived arrays from each wavelength overlap on the object.

13. Generating apparatus as recited in claim 12, wherein said beam partitioning and array generating means comprise a set of two, orthogonally oriented three-facet prisms having linear edges which intersect with one another at multiple locations, said beams being aligned with said locations and when projected into said locations generating multiple of sets of arrays.

14. Generating apparatus as recited in claim 13, wherein each beam contains multiple wavelengths of light coaxially aligned with an intersecting location of said linear edges of said prisms and when projected into said intersecting location generating multiple sets of arrays for each intersecting location.

15. Generating apparatus as recited in claim 13, wherein said projecting means includes a plurality of lenses of differing focal lengths.

* * * * *